US005091087A

United States Patent [19]

Calundann et al.

[11] Patent Number: 5,091,087
[45] Date of Patent: Feb. 25, 1992

[54] FABRICATION OF MICROPOROUS PBI MEMBRANES WITH NARROW PORE SIZE DISTRIBUTION

[75] Inventors: Gordon W. Calundann, North Plainfield; Tai-Shung Chung, Randolph, both of N.J.

[73] Assignee: Hoechst Celanese Corp., Somerville

[21] Appl. No.: 543,920

[22] Filed: Jun. 25, 1990

[51] Int. Cl.$^5$ .............................................. B01D 69/06
[52] U.S. Cl. .................................. 210/500.28; 264/49
[58] Field of Search ............... 210/500.28; 264/144, 264/239, 257, 333.11, 49, 41; 428/287; 521/64, 180

[56] References Cited

U.S. PATENT DOCUMENTS

| | | | |
|---|---|---|---|
| 3,797,494 | 3/1974 | Zaffaroni | 424/434 |
| 4,717,619 | 1/1988 | Letinski | 264/144 X |
| 4,828,699 | 5/1989 | Soehngen | 210/500.28 |

Primary Examiner—Frank Spear
Attorney, Agent, or Firm—James L. McGinnis

[57] ABSTRACT

A microporous polybenzimidazole membrane having a uniform pore structure and a narrow pore size distribution, and a process for making the membrane. The process requires coating a polybenzimidazole powder with a high temperature stable polymer and compression molding the coated particles at a temperature in the approximate range of 435°–450° C. to form a sheet or membrane. The polymer is then extracted from the sheet, leaving a fine, uniform, polybenzimidazole microporous structure.

9 Claims, 2 Drawing Sheets

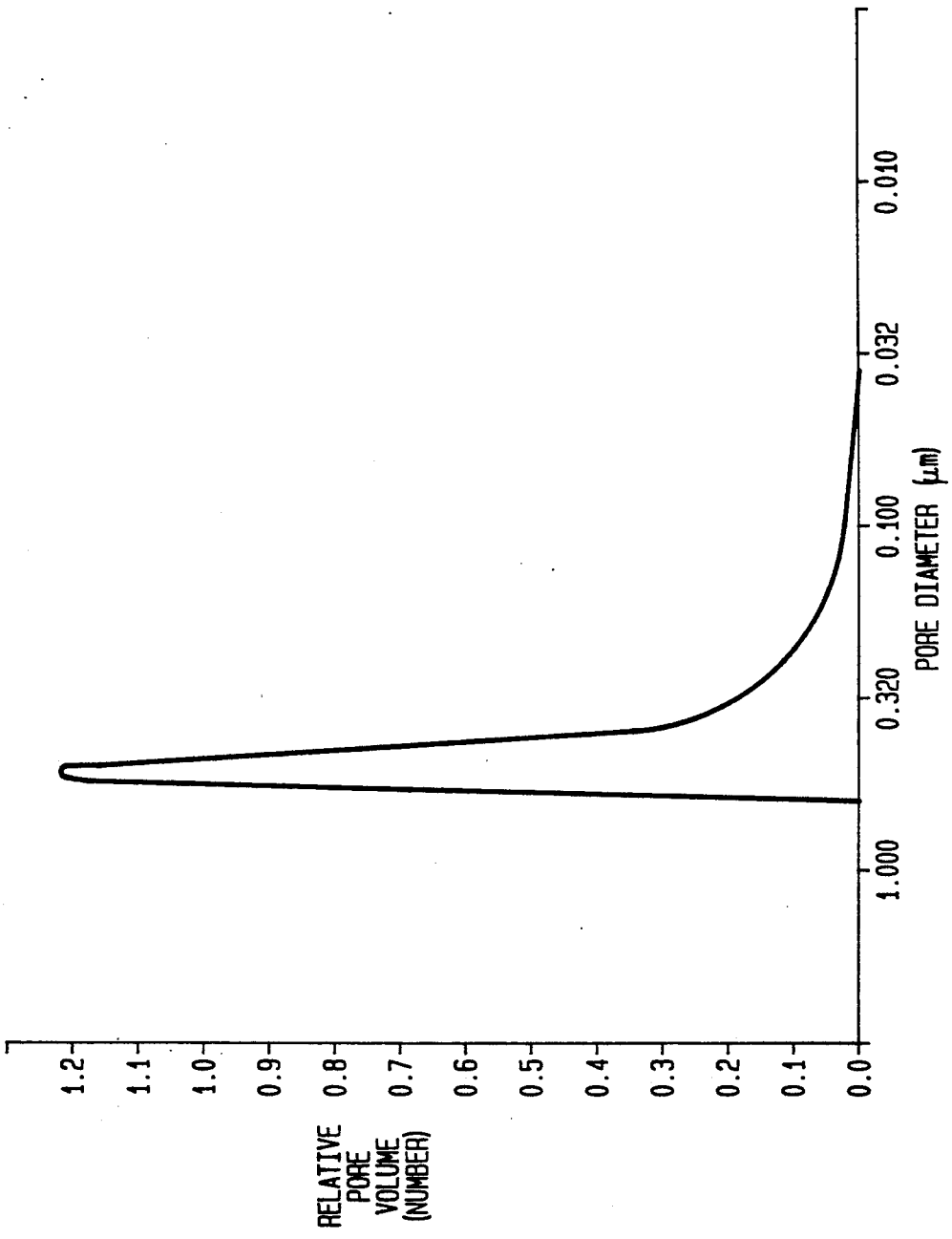

FABRICATION OF MICROPOROUS PBI MEMBRANES WITH NARROW PORE SIZE DISTRIBUTION

BACKGROUND OF THE INVENTION

This invention relates to the fabrication of microporous membranes, especially to the fabrication of microporous polybenzimidazole membranes having a relatively narrow pore size distribution and uniform porosity.

Porous membranes are well-known to those skilled in the art. Generally they comprise thin films or hollow fibers made from organic polymers. These membranes contain voids (pores) which are quite large in comparison to molecular dimensions. The pore size may vary over a wide range and the porosity may not be uniform from one membrane area to another. The essential transport characteristics of porous membranes depend upon the pore structure. Selectivity depends on the size of the molecule relative to the pores, as well as on mutual attractions and repulsions between the membrane and the molecules or particles passing therethrough.

Microporous membranes typically have pores between about 0.005 and 20 microns in diameter. Their uses include filtration and separation applications. These membranes can be used for the separation of very small particles, such as colloids and polymers, either from each other or from the liquid in which they are suspended. They are also useful as separators in rechargable batteries, wherein two electrodes must be physically separated from each other in such a way that there is a continuous pathway for exchange of small ions without the mixing of reactants and products of the two half-cell reactions. These types of membranes can also be used in applications in which gas diffusion is desired, as in blood oxygenators, wherein the membrane has a liquid in contact with one surface and a gas in contact with the other surface. Typically, the efficiency and selectivity of these membranes are limited by a wide pore size range and by nonuniformities in the pore structure.

A process for the production of microporous polybenzimidazole articles is disclosed in U.S. Pat. No. 4,828,699. According to this process, membranes may be made by dissolving polybenzimidazole and a leachable additive in an appropriate solvent, depositing this solution onto a support to form a wet film and evaporating solvent to provide a thin solid layer. The membrane is made microporous by washing with a solvent that dissolves the additive and removes the remaining traces of the original solvent but does not dissolve PBI. This method is somewhat limited in that only relatively thin films may be produced; furthermore, it requires dissolving the PBI.

SUMMARY OF THE INVENTION

This invention provides a process for making a microporous polybenzimidazole (PBI) membrane or layer having a relatively narrow pore size distribution and a uniform pore structure. The process comprises immersing fine PBI particles in a polymeric solution of a high temperature stable matrix polymer, e.g. a polyimide, polysulfone, polyarylate, polycarbonate, or other suitable polymer, to coat the PBI with the matrix polymer, drying the coated PBI particle, compression molding said particles at about 435°–450° C. to sinter the PBI, and extracting the matrix polymer from the molded PBI. A sheet of microporous PBI having a fine surface and internal structure may be formed by this process.

This invention also includes a microporous PBI membrane having a uniform, fine pore structure.

It is an object of the present invention to provide a process for forming a microporous membrane having uniform porosity and a narrow pore size distribution.

It is also an object of this invention to provide a method for making a PBI microporous membrane.

It is another object of the present invention to provide a microporous PBI membrane suitable for filtration and separation applications.

It is a further object of this invention to provide a process for producing a microporous PBI membrane wherein the PBI need not be dissolved.

Additional objects of the present invention will occur to those skilled in the art from the following description and examples.

BRIEF DESCRIPTION OF THE DRAWINGS

FIG. 3 is a plot of the pore size distribution of a microporous membrane of the present invention.

DETAILED DESCRIPTION OF THE PREFERRED EMBODIMENTS

Figure 1:
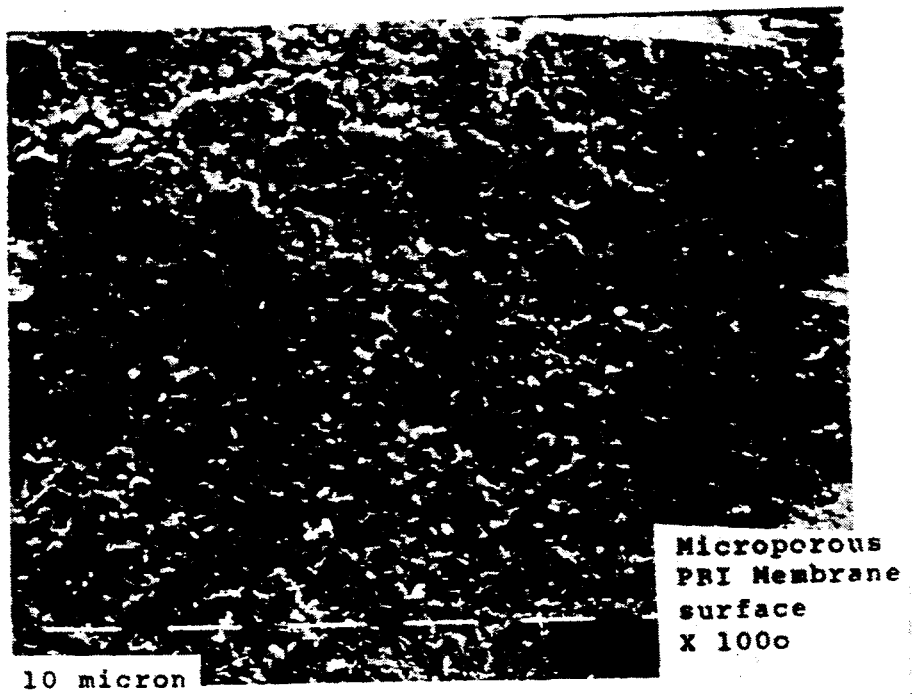
FIG. 1 is a scanning electron photomicrograph of the surface of a membrane according to the present invention magnified 1000 times.

In one embodiment of the present invention micronsize PBI powders are used to form microporous membranes. These powders are manufactured by Hoechst Celanese Corporation (Bridgewater, N.J.). The PBI particle size is about 5 microns. Particles about 5 microns or less are preferred for making these membranes.

PBI is processed at a high temperature. For this reason, the matrix polymer used to coat the PBI is selected for its high temperature stability, i.e., the polymer should be stable at temperatures up to about 450°–460° C. or higher. The polymer also should be highly soluble in one or more solvents in which PBI is not soluble. High viscosity is desirable in a matrix polymer, as well. Generally, polyimides are a suitable choice, e g.: SIX-EF TM -44, a polymer made from 2,2-bis(4-aminophenyl)hexafluoropropane and 2,2-bis(3,4-dicarboxyphenyl) hexafluoropropane dianhydride; or, polyetherimide. In addition, polysulfone, polyarylate, and polycarbonate are generally suitable as matrix polymers.

The matrix polymer and the PBI powder are immersed in a suitable polymer solvent, e.g., dichloromethane, acetone, or the like. A PBI dispersion is formed; the dispersion is then dried by any suitable method, resulting in dry polymer-coated PBI particles. A suitable PBI/matrix polymer ratio is about 30/70 to about 80/20 by weight, preferably about 60/40 to about 70/30.

The coated particles are then compression molded or calendered into a thin sheet at a temperature in the approximate range of 435°–450° C. to sinter the PBI. This produces irreversible, partial agglomeration of the fine PBI particles. By partial, irreversible agglomeration, it is meant that the particles which are in contact with each other will, at the point of contact, neck over or flow into each other. However, the individual particles will still have a discernable particulate shape in areas where there has been no necking or direct particle flow. If full coalescence or melting of the PBI occurred, the film would not have the desired unique microporous character.

It is also necessary that any heating which occurs be uniform in nature. Non-uniform heating produces film having both hot and cold spots. In the cold spots—where heating above the melting point of the PBI does not occur—the final film may lack film integrity. Where the film was too hot, and where the microparticles completely coalesced and did not simply neck over only at points of contact, the final film will have no microporous character.

In general the temperature which is chosen for heating or calendering should be at or above the softening point or flow temperature of the PBI, i.e., up to about 10° C. above. The time during which the film should be heated at this temperature will vary depending upon the degree of microporous character which is desired in the final film.

Where great porosity is desired lesser heating is employed. In general, heating should be for periods up to about ten minutes, or long enough to assure that the particles partially agglomerate. The degree of exposure will also depend upon the film thickness, with thicker films requiring greater exposure to heat. Heating may be carried out by microwave, by radiant heat or by any other method.

Molding pressure and conditions will depend upon the nature of the film being treated, the nature of the film desired, the properties of the film and other factors. With increased pressure, generally, the porosity of the final microporous film decreases. In the usual case, calendering is carried out at compression pressures in the range of about 1,000-7,000 psi.

The molded/calendered film is then treated with a solvent which will dissolve and extract virtually all of the binder matrix polymer.

Typically, no more than about five percent, and preferably no more than about two percent, of the binder polymer remains after extraction. If higher levels of the binder polymer remain the binder polymer may leach out or may degrade in the corrosive atmosphere in which the PBI films of the instant invention are designed to operate. Extraction may be carried out according to methods well known in the art for forming microporous membranes. For example, the film of the instant invention may simply be immersed in a bath of the leaching solvent and left in the bath until the binder polymer is dissolved with or without the aid of ultrasonic wave equipment. Instead of employing a batch method, it is possible to employ a continuous method, such as a countercurrent multistaged extraction.

The solvents which are useful for extraction include any solvents in which the binder polymer is soluble but the polyhalogenated copolymer is insoluble. Typically, the extraction solvent will be the same as the solvent in which the binder polymer was dissolved before blending with the PBI copolymer.

After the extraction process is completed the film is dried and stored for use.

The microporous films of the instant invention have good porosities and are essentially free from pinholes. In general, the films of the instant invention will have porosities of up to about 65 percent, preferably about 25 to about 55 percent.

The final product is a fine microporous PBI structure having a narrow pore size distribution, the pore diameters typically being between about 0.10 and about 1.00 microns with the majority of the pores having diameters in the range of about 0.20 and about 0.70 microns.

In a preferred embodiment of the present invention, the dry, coated PBI particles are ground before compression molding to make the particles finer. Generally, this results in a PBI structure wherein substantially all the pores are less than about 0.70 microns and greater than about 0.05 microns in diameter; most of the pores will be between about 0.20 and about 0.60 microns.

Compression molding typically is effected at a pressure of about 1,000-7,000 psi for about 5-10 minutes. However, these parameters may be varied as long as the coated particles are pressed into the form of a sheet or membrane. Generally, higher pressures require less time, whereas more time is required to compression mold the PBI powder at lower pressures. A minimum pressure of about 2,000 psi is believed necessary to accomplish this molding; at this pressure, the molding could require up to about 20 minutes, depending upon the compression temperature and thickness.

In most membrane applications it is preferable to have as thin a membrane as possible. This invention provides a method for making PBI membranes as thin as about 200 micron or less. In the preferred embodiments, the membranes are about 50 to about 150 microns thick. However, this method is also suitable for making thicker membranes or layers up to 1,000 microns or more. In fact, there is no upper limit very thick articles may be fashioned from the coated PBI particles by compression molding. Of course, the thicker is the article the more extraction time is needed to remove the matrix polymer.

Extraction of the matrix polymer from the molded sheet may be accomplished using the same solvent as was used to coat the PBI with the matrix polymer, or with any solvent that readily dissolves the matrix polymer but not PBI. Any other suitable polymer removal technique may be used, provided that the microporous PBI structure is not disturbed.

Microporous PBI membranes have many possible uses, including use in battery separation applications, for filtration, or for gas separations. They are particularly well-suited where high temperature stability and chemical stability are required. Those skilled in the art will realize the many applications for which these membranes are suited.

The following non-limiting Examples are provided to illustrate the present invention.

EXAMPLE I

A 6 g. portion of SIXEF ™ -44 polyimide was dissolved in 50 ml. of dichloromethane and a 14 g. portion of PBI powder was added to the solution, forming a PBI dispersion. This dispersion was dried in a vacuum oven at 100° C. over night. The polyimide-coated PBI particles were about 70% PBI and about 30% polyimide by weight. These particles were ground to pass through a 20-mesh screen and then compression molded at 445° C. and 48,000 pounds of pressure (applied to a circular area 3 inches in diameter) for about ten minutes into the form of a thin sheet or membrane about 200 microns thick. The membrane was rinsed thoroughly with dichloromethane to extract the polyimide, leaving a fine microporous PBI membrane.

A visual analysis of the film prepared in this example was carried out by electron microscope.

Figure 2:
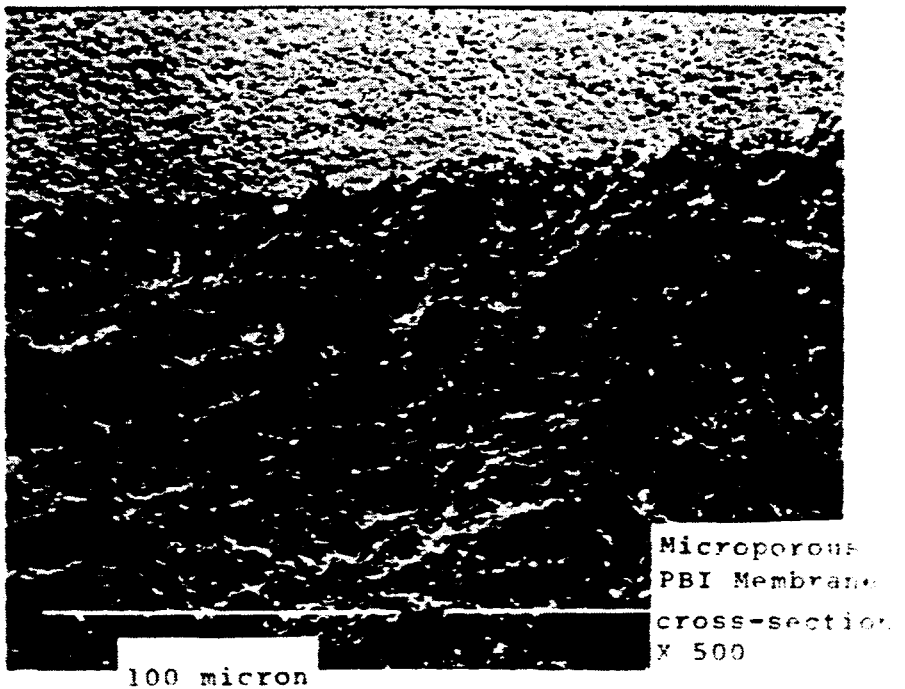
FIG. 2 is a scanning electron photomicrograph of the cross-section of the membrane of FIG. 1 magnified 500 times.

FIG. 1 is an SEM picture of the membrane surface structure. FIG. 2 is an SEM picture of the membrane cross-sectional structure. As can be seen, the microporous films of the instant invention have small, uniform, round pores. FIG. 3 shows the pore size distribution for this membrane. It can be seen that the distribution is very narrow. It can also be seen that this film is isotropic.

The porosity of this membrane was analyzed using a Gurley Densometer to measure the time it takes a specified quantity of air to pass therethrough. A higher Gurley number indicates lesser porosity. The Gurley number was 25 seconds.

EXAMPLE II

The same procedure was followed as in Example I except that the solvent was acetone, and the compression temperature was 440° C. The resulting membrane was virtually indistinguishable from the membrane of Example I.

EXAMPLE III

The same procedure was followed as in Example II, except that the matrix polymer was G. E. Ultem 1000. The film had a thickness of about 150 μm. The internal structure of the microporous film was essentially the same as that of the film in Example II. This film had a Gurley number of 7 seconds. This indicates a high percentage of voids. This is a result of using Ultem 1000, which has a high viscosity at the processing temperature. This viscous polymer was well-retained in the PBI film during molding so that when the polymer was extracted the PBI film was left with a large number of voids.

EXAMPLE IV

The same procedure was followed as in Example I except that the compression temperature was 440° C., and during molding the pressure was bumped up four times to tighten the film structure, i.e. momentary increases in pressure were applied suddenly and then the added pressure was released. The Gurley number was 109 seconds.

It will be appreciated that many variations of the process and membrane described and illustrated herein are possible without departing from the spirit and essence of this invention. The invention encompasses all subject matter within the scope of the appended claims.

We claim:

1. A process for fabricating a microporous layer or membrane of polybenzimidazole comprising the steps of:
    (a) coating fine particles of polybenzimidazole with a matrix polymer, said matrix polymer being stable at temperatures up to at least about 450° C.;
    (b) compression molding said coated particles at a temperature in the approximate range of 435°–450° C. to induce partial agglomeration of the polybenzimidazole and to form said layer or membrane; and,
    (c) extracting said matrix polymer from said layer or membrane.

2. A process according to claim 1 wherein said step (a) comprises:
    dissolving said matrix polymer in a solvent that does not dissolve polybenzimidazole;
    immersing said particles into the polymeric solution; and, evaporating said solvent.

3. A process according to claim 1 further comprising the step of grinding said coated particles prior to said compression molding step to make said particles finer.

4. A process according to claim 1 wherein said compression molding step further comprises applying a pressure of from about 1,000 to about 7,000 psi for from about 5 to about 10 minutes.

5. A process according to claim 1 wherein said matrix polymer is a polyimide, polysulfone, polyarylate, polycarbonate or a mixture thereof.

6. A process according to claim 5 wherein said polymer is either polyetherimide or SIXEF TM-44, or a combination thereof.

7. A microporous polybenzimidazole membrane made according to the process of claim 1.

8. A process for fabricating a microporous polybenzimidazole membrane having uniform porosity and a narrow pore size distribution comprising:
    dissolving a polymer in a solvent that does not dissolve polybenzimidazole to form a polymeric solution, said polymer being stable at temperatures up to at least about 450° C.;
    immersing a polyimidazole powder in said polymeric solution to form a polybenzimidazole dispersion, said powder comprising particles that are about five microns or less in diameter;
    evaporating said solvent from said dispersion to provide dry polybenzimidazole particles coated with said polymer;
    compression molding said particles at about 435°–450° C. and about 1,000–7,000 psi for about 5–10 minutes into the form of a membrane; and,
    extracting said polymer from said membrane.

9. A membrane made according to the process set forth in claim 8.

* * * * *